US012597782B2

(12) United States Patent
Saboury et al.

(10) Patent No.: US 12,597,782 B2
(45) Date of Patent: Apr. 7, 2026

(54) CHARGER INCLUDING MULTIPLE ADJUSTABLE POWER SOURCES

(71) Applicant: MILWAUKEE ELECTRIC TOOL CORPORATION, Brookfield, WI (US)

(72) Inventors: Justin Saboury, Brookfield, WI (US); Vivek S. Nagal, Sussex, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 666 days.

(21) Appl. No.: 17/957,394

(22) Filed: Sep. 30, 2022

(65) Prior Publication Data

US 2023/0097967 A1     Mar. 30, 2023

Related U.S. Application Data

(60) Provisional application No. 63/250,481, filed on Sep. 30, 2021.

(51) Int. Cl.
H01M 10/44          (2006.01)
H01M 10/46          (2006.01)
(Continued)

(52) U.S. Cl.
CPC ............. H02J 7/50 (2026.01); H01M 10/441 (2013.01); H02J 7/731 (2026.01); H01M 2220/30 (2013.01)

(58) Field of Classification Search
CPC ...... H02J 7/0013; H02J 7/0044; H02J 7/0042; H02J 2207/20
(Continued)

(56) References Cited

U.S. PATENT DOCUMENTS

| | | | |
|---|---|---|---|
| 4,591,777 A | 5/1986 | McCarty et al. | |
| 4,739,242 A | 4/1988 | McCarty et al. | |

(Continued)

FOREIGN PATENT DOCUMENTS

| | | | | |
|---|---|---|---|---|
| CA | 2565372 A1 * | 4/2007 | .......... | H02J 7/00047 |
| CN | 109617195 A | 4/2019 | | |

(Continued)

OTHER PUBLICATIONS

International Search Report and Written Opinion for Application No. PCT/US2022/045353 dated Feb. 1, 2023 (10 pages).
(Continued)

*Primary Examiner* — Edward Tso
(74) *Attorney, Agent, or Firm* — Michael Best & Friedrich LLP

(57) ABSTRACT

A battery pack charger includes a housing, a plurality of battery receptacles supported by the housing each configured to receive a battery pack, a plurality of output power supplies, a plurality of charging circuits configured to transmit power from one of the plurality of output power supplies to one or more of the plurality of battery receptacles, a plurality of switches included in the plurality of charging circuits, and a controller. The controller is operable to receive signals from charging circuits that are indicative of battery packs being received by each of the battery receptacles, control the plurality of switches to one of a first position or a second position based on the input, and provide one of a first output power and a second output power to each of the battery pack receptacles.

20 Claims, 10 Drawing Sheets

(51) Int. Cl.
     *H02J 7/50* (2026.01)
     *H02J 7/70* (2026.01)
(58) Field of Classification Search
     USPC .......................... 320/107, 114, 116, 125, 138
     See application file for complete search history.

(56)                References Cited

U.S. PATENT DOCUMENTS

| | | | |
|---|---|---|---|
| 5,363,031 A | 11/1994 | Miller et al. | |
| 6,018,227 A | 1/2000 | Kumar et al. | |
| 6,160,376 A | 12/2000 | Kumar et al. | |
| 6,184,655 B1 | 2/2001 | Malackowski | |
| 6,331,761 B1 | 12/2001 | Kumar et al. | |
| 6,522,101 B2 | 2/2003 | Malackowski | |
| 9,537,335 B2 | 1/2017 | Furui et al. | |
| 9,577,450 B2 | 2/2017 | Yoshikawa et al. | |
| 9,595,839 B2 | 3/2017 | Furui et al. | |
| 9,748,778 B2 | 8/2017 | Toya | |
| 9,780,583 B2 | 10/2017 | Furui et al. | |
| 10,044,197 B2 | 8/2018 | Fry et al. | |
| 10,090,692 B2 | 10/2018 | Yoshikawa et al. | |
| 10,124,455 B2 | 11/2018 | Ito et al. | |
| 10,381,856 B2 | 8/2019 | Zhang et al. | |
| 10,396,573 B2 | 8/2019 | Furui et al. | |
| 10,749,360 B2 | 8/2020 | Furui et al. | |
| 10,763,677 B2 | 9/2020 | Kim et al. | |
| 10,797,496 B2 | 10/2020 | Grifoni | |
| 10,811,885 B2 | 10/2020 | Fry et al. | |
| 11,061,457 B1 | 7/2021 | Bhattacharjee et al. | |
| 11,114,870 B2 | 9/2021 | Furui et al. | |
| 11,283,131 B1 | 3/2022 | Carroll | |
| 11,772,504 B2 | 10/2023 | Sasu | |
| 2003/0218384 A1 | 11/2003 | Yoneda | |
| 2006/0103242 A1 | 5/2006 | Lin | |
| 2006/0119992 A1 | 6/2006 | Pearce | |
| 2009/0267562 A1 | 10/2009 | Guccione et al. | |
| 2011/0148344 A1 | 6/2011 | Manor et al. | |
| 2013/0069583 A1 | 3/2013 | Lemelman et al. | |
| 2014/0117922 A1 | 5/2014 | Pham | |
| 2014/0151079 A1 | 6/2014 | Furui et al. | |
| 2015/0008879 A1 | 1/2015 | Schneider et al. | |
| 2015/0326044 A1 | 11/2015 | Ashley et al. | |
| 2016/0099581 A1 | 4/2016 | Kawamura et al. | |
| 2016/0276844 A1 | 9/2016 | Gekinozu | |
| 2017/0063114 A1* | 3/2017 | Briere | H02J 7/0013 |
| 2017/0346334 A1 | 11/2017 | Mergener et al. | |
| 2018/0034282 A1 | 2/2018 | Zhang et al. | |
| 2019/0131667 A1* | 5/2019 | Huang | H02J 7/0018 |
| 2019/0157881 A1* | 5/2019 | Velderman | H02J 7/0013 |
| 2019/0214840 A1 | 7/2019 | Zhang et al. | |
| 2020/0358303 A1 | 11/2020 | Yang et al. | |
| 2020/0403425 A1 | 12/2020 | Fry et al. | |
| 2021/0013725 A1 | 1/2021 | Bhasin et al. | |
| 2021/0083500 A1 | 3/2021 | Quek et al. | |
| 2021/0143655 A1 | 5/2021 | Truettner et al. | |
| 2021/0305838 A1 | 9/2021 | Stellnert et al. | |
| 2021/0360803 A1 | 11/2021 | Semon et al. | |
| 2021/0367435 A1 | 11/2021 | Furui et al. | |
| 2022/0102997 A1 | 3/2022 | Gao et al. | |
| 2022/0123567 A1 | 4/2022 | Truettner | |
| 2022/0149641 A1 | 5/2022 | Silva et al. | |
| 2023/0318316 A1 | 10/2023 | Brochtrup et al. | |

FOREIGN PATENT DOCUMENTS

| | | | |
|---|---|---|---|
| CN | 110198066 A | 9/2019 | |
| CN | 220273365 U | 12/2023 | |
| EP | 3208911 A2 | 8/2017 | |
| JP | 2014220973 A | 11/2014 | |
| JP | 2018037460 A | 3/2018 | |
| WO | WO-2013123480 A1 * | 8/2013 | B60L 53/305 |
| WO | 2018131874 A1 | 7/2018 | |
| WO | 2021078849 A1 | 4/2021 | |

OTHER PUBLICATIONS

Extended European Search Report for Application No. 22877373.5 dated Jun. 26, 2025 (9 pages).

* cited by examiner

805 — RECEIVE FIRST AND SECOND BATTERY PACKS

810 — RECEIVE LOW-POWER CONFIGURATION USER INPUT

815 — OPEN PARALLEL SWITCH AND CLOSE SERIES SWITCHES

820 — PROVIDE FIRST OUTPUT CHARGING CURRENT TO FIRST BATTERY PACK AND SECOND OUTPUT CHARGING CURRENT TO SECOND BATTERY PACK

900

905 — RECEIVE AT LEAST ONE BATTERY PACK

910 — RECEIVE HIGH-POWER CONFIGURATION USER INPUT

915 — CLOSE PARALLEL SWITCH AND FIRST SERIES SWITCH AND OPEN SECOND SERIES SWITCH

920 — PROVIDE SUM OF FIRST AND SECOND OUTPUT CHARGING CURRENTS TO FIRST BATTERY PACK

1000

1005 — RECEIVE AT LEAST TWO BATTERY PACKS

1010 — RECEIVE USER INPUT

1015 — CONTROL SWITCHES TO PROVIDE REQUESTED OUTPUTS TO THE AT LEAST TWO BATTERY PACKS

CHARGER INCLUDING MULTIPLE ADJUSTABLE POWER SOURCES

RELATED APPLICATIONS

This application claims the benefit of U.S. Provisional Patent Application No. 63/250,481, filed Sep. 30, 2021, the entire content of which is hereby incorporated by reference.

FIELD

Embodiments described herein relate to battery packs.

SUMMARY

Battery pack chargers typically are rated to charge a particular type of battery pack based on the charge rating of the battery pack. For example, a battery pack charger typically outputs a single maximum current to battery packs that are coupled to the battery pack charger. It would be advantageous to have a battery pack charger that was capable of outputting multiple different maximum charging currents to different battery packs.

Cordless power tools rely on battery packs to supply power to the power tool in order to be operable. In order to maximize work time when using a cordless power tool, it is important to have a readily available supply of charged battery packs. Multi-bay battery pack chargers allow for multiple battery packs to be charged simultaneously. However, conventional multi-bay battery pack chargers output a set amount of power to each battery pack coupled to a charging port of the battery pack. Outputting a set amount of power to each battery pack does not provide flexibility for a user to charge battery packs with various power ratings or at various rates. For example, a user may wish to use a low power setting to fully charge at least two battery packs over a greater amount of time. Alternatively, a user may wish to quickly charge a single battery pack by enabling a controller to output a high power setting to the battery pack. It would be advantageous for a controller to control switches that provide flexibility in the charge rate from multiple power supplies to battery packs that are coupled to the multi-bay battery pack charger. As a result, multiple battery packs with various power ratings may be charged at various charge rates. Accordingly, there is a need for a multi-bay battery pack charger with at least two power supplies and switches that are controllable by a controller to provide a desired output power to at one or more battery packs.

Embodiments described herein provide a battery pack charger for charging power tool battery packs. The battery pack charger includes a housing, a plurality of battery receptacles supported by the housing that are each configured to receive a battery pack, a plurality of output power supplies, a plurality of charging circuits that are configured to transmit power from one of the plurality of output power supplies to one or more of the plurality of battery receptacles, a plurality of switches included in the plurality of charging circuits, and a controller. The controller is operable to receive signals from the plurality of charging circuits that are indicative of battery packs being received by each of the plurality of battery receptacles, receive an input from the plurality of charging circuits, switch each of the plurality of switches to one of a first position or a second position based on the received input, and provide one of a first output power and a second output power to each of the battery pack receptacles.

In some aspects, the first output power is one of a no-power output, a low-power output, and a high-power output.

In some aspects, the second output power is one of the no-power output, a medium-power output, and the high-power output.

In some aspects, the first output power is lower than the second output power based on a difference between the received input.

In some aspects, a first switch of the plurality of switches is in the first position, a second switch of the plurality of switches is in the second position, and a third switch of the plurality of switches is in the first position.

In some aspects, the first output power is zero and the second output power is a maximum charging power based on a difference between the received input.

In some aspects, a first switch of the plurality of switches is in the first position, a second switch of the plurality of switches is in the first position, and a third switch of the plurality of switches is in the second position.

In some aspects, the controller is further configured to provide one of the first output power, the second output power, and a third output power to each of the battery pack receptacles.

In some aspects, the first output power is less than the second output power, and the second output power is less than the third output power.

In some aspects, the first output power corresponds to a first charging current of at least about 6 Amps, and the second output power corresponds to a second charging current of at least about 9 Amps.

Embodiments described herein provide a method for providing output power to a plurality of battery packs. The method includes receiving, at an electronic processor, an input from a plurality of charging circuits, and controlling, via the electronic processor, each of a plurality of switches of the battery pack charger to one of a first position or a second position based on the received input. The method further includes providing, via the electronic processor, a first output power to a first battery pack of the plurality of battery packs from at least a first output power supply via a first charging circuit of the plurality of charging circuits, and providing, via the electronic processor, a second output power to a second battery pack of the plurality of battery packs from at least a second output power supply via a second charging circuit of the plurality of charging circuits.

In some aspects, the first output power is one of a no-power output, a low-power output, and a high-power output.

In some aspects, the second output power is one of the no-power output, a medium-power output, and the high-power output.

In some aspects, the method further includes providing, via the electronic processor, a third output power to a third battery pack of the plurality of battery packs from at least a third output power supply via a third charging circuit.

Embodiments described herein provide a system. The system includes a plurality of battery packs and a battery pack charger. The battery pack charger of the system includes a housing, a plurality of battery pack receptacles supported by the housing, each of the plurality of battery pack receptacles configured to receive a battery pack, a plurality of output power supplies, a plurality of charging circuits, each of the plurality of charging circuits configured to transmit power from at least one of the plurality of output power supplies to one of the plurality of battery pack receptacles, a plurality of switches associated with the plurality of charging circuits, and a controller. The controller is operable to determine that the plurality of battery packs are received by the plurality of battery pack receptacles, receive an input from the plurality of charging circuits, control the plurality of switches to one of a first position or a second position based on the received input, and provide one of a first output power and a second output power to each of the plurality of battery pack receptacles.

In some aspects, the input is at least one of a power rating or a requested power corresponding to each of the plurality of battery packs.

In some aspects, a first battery pack of the plurality of battery packs has a first power rating, a second battery pack of the plurality of battery packs has a second power rating, and the first power rating is lower than the second power rating.

In some aspects, a first switch of the plurality of switches is in the first position, a second switch of the plurality of switches is in the second position, and a third switch of the plurality of switches is in the first position.

In some aspects, a first battery pack of the plurality of battery packs does not request power, and a second battery pack of the plurality of battery packs requests power.

In some aspects, a first switch of the plurality of switches is in the first position, a second switch of the plurality of switches is in the first position, and a third switch of the plurality of switches is in the second position.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIG. 3 illustrates a battery pack, according to embodiments described herein.

FIG. 5 illustrates a schematic diagram of charging control circuitry for the multi-bay battery pack charger of FIG. 1 or FIG. 2, according to embodiments described herein.

FIG. 6 illustrates a schematic diagram of charging control circuitry for the multi-bay battery pack charger of FIG. 2, according to embodiments described herein.

FIG. 7 illustrates a schematic diagram of charging control circuitry for the multi-bay battery pack charger of FIG. 2, according to embodiments described herein.

DETAILED DESCRIPTION

Embodiments described herein relate to a battery pack charger that can output various charging currents from power supplies based on a requested charge configuration.

Figure 1:
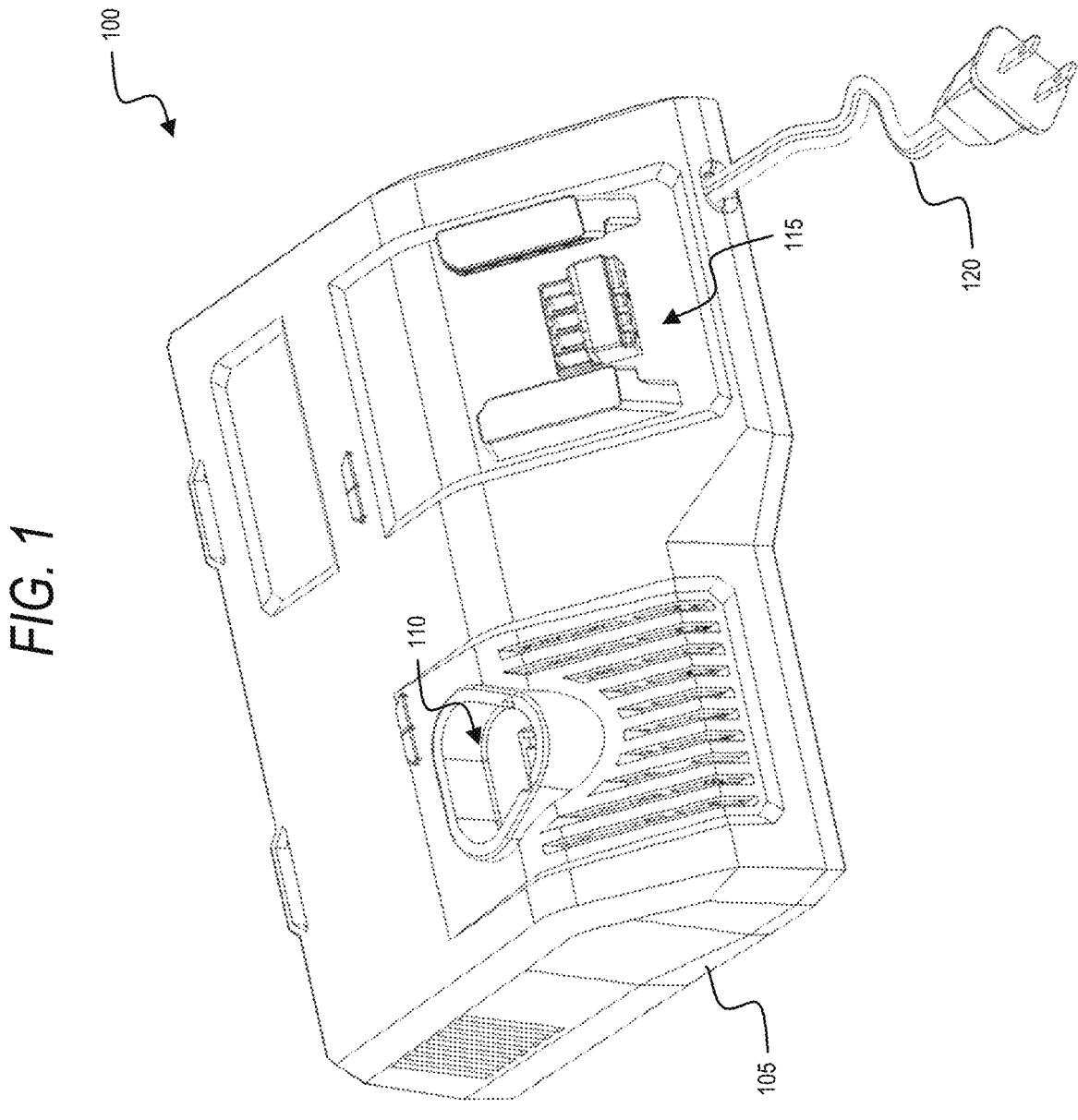
FIG. 1 illustrates a multi-bay battery pack charger, according to embodiments described herein.

FIG. 1 illustrates a battery pack charger 100. The battery pack charger 100 includes a housing 105, interface portions 110, 115, and a cord 120. The interface portions 110, 115 electrically connect the battery pack charger 100 to one or more battery packs (e.g., battery pack 215) through charging circuits. For example, charging circuits provides power to at least one battery pack from at least one power supply that receives power from a power input circuit (see FIGS. 5-7). The cord 120 allows the battery pack charger 100 to receive power from an external power source (e.g., a conventional wall outlet).

In some embodiments, the battery pack charger 100 may charge multiple battery packs with various power ratings at once. For example, interface portion 110 may be a six Amperes (Amps) power supply for charging batteries with a six amp power rating and interface portion 115 may be a 12 amp power supply for charging batteries with a 12 amp power rating. As another example, the battery pack charger 100 may include circuitry such that a battery pack with an 18 amp power rating may be charged by one of the interface portions 110, 115. As will be described in detail below, the charging circuits may include or be connected to switches that enable the power supplies to provide various output powers to various battery packs depending on a user input.

Figure 2:
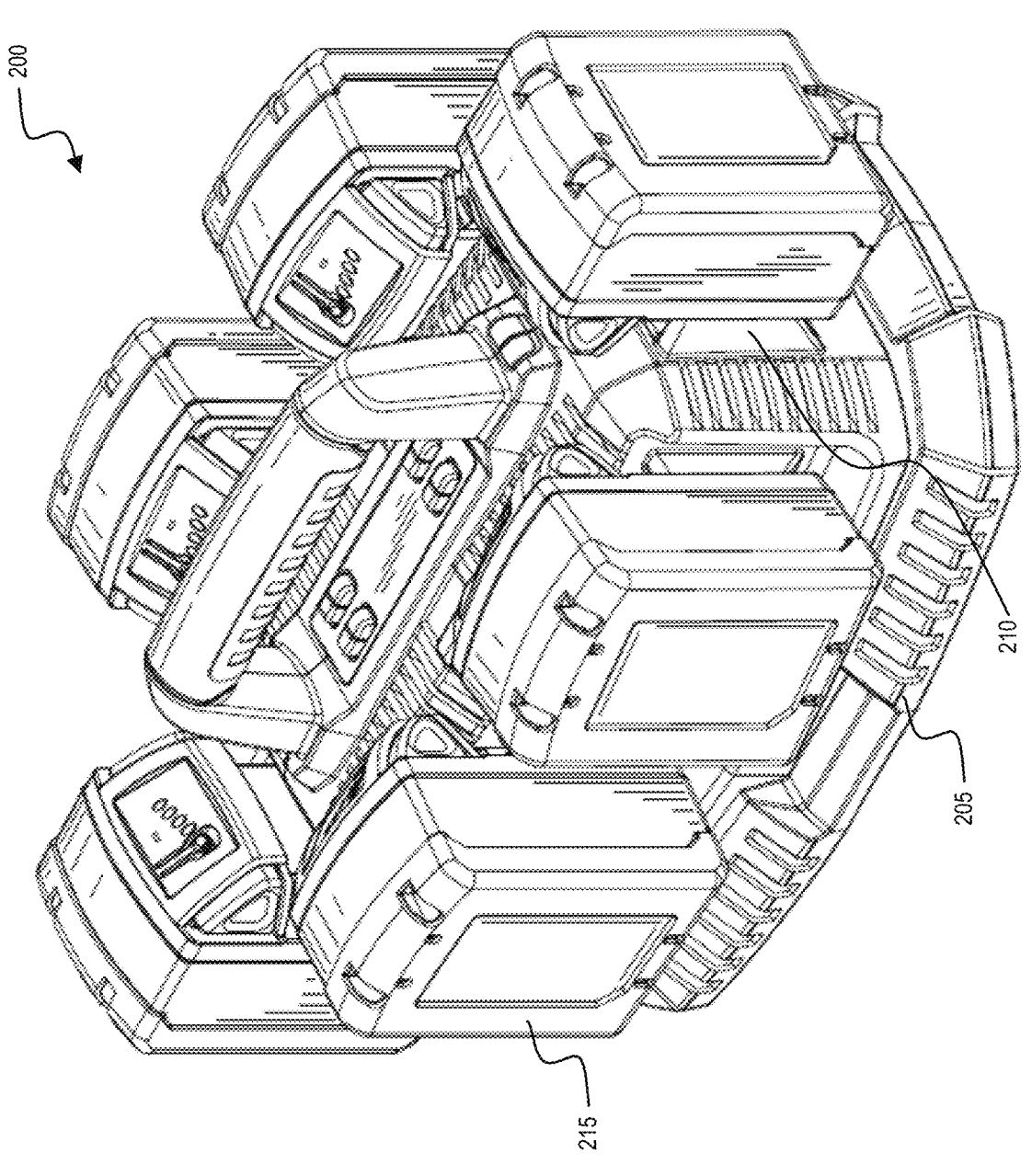
FIG. 2 illustrates a multi-bay battery pack charger, according to embodiments described herein.

FIG. 2 illustrates a multi-bay battery pack charger 200. The multi-bay battery pack charger ("charger") 200 includes a housing 205 and battery receptacles 210 for receiving battery packs 215. The charger 200 is configured to distribute power to the battery packs 215. The battery packs 215 are configured to provide power to peripheral devices. The peripheral devices may be handheld power tool or the like. The charger 200 is also configured to receive power from a power source and use the power from the power source to distribute charging power to the battery packs 215. In some embodiments, the power source is a DC power source, for example, a photovoltaic cell (e.g., a solar panel) or one or more batteries. In other embodiments, the power source is an AC power source, for example, a conventional wall outlet.

The battery receptacles 210 are positioned on the exterior of the housing 205 and are configured to receive the battery packs 215. In the illustrated embodiment, the battery packs 215 are slide-on style battery packs. Accordingly, the battery receptacles 210 include guide rails to receive the slide-on style battery packs and latching mechanisms to secure the two components together. In the illustrated embodiment, the battery packs 215 may be six volt battery packs, 12 Volt battery pack and/or 18 Volt battery packs, etc., and can have a lithium-based chemistry.

Figure 3:
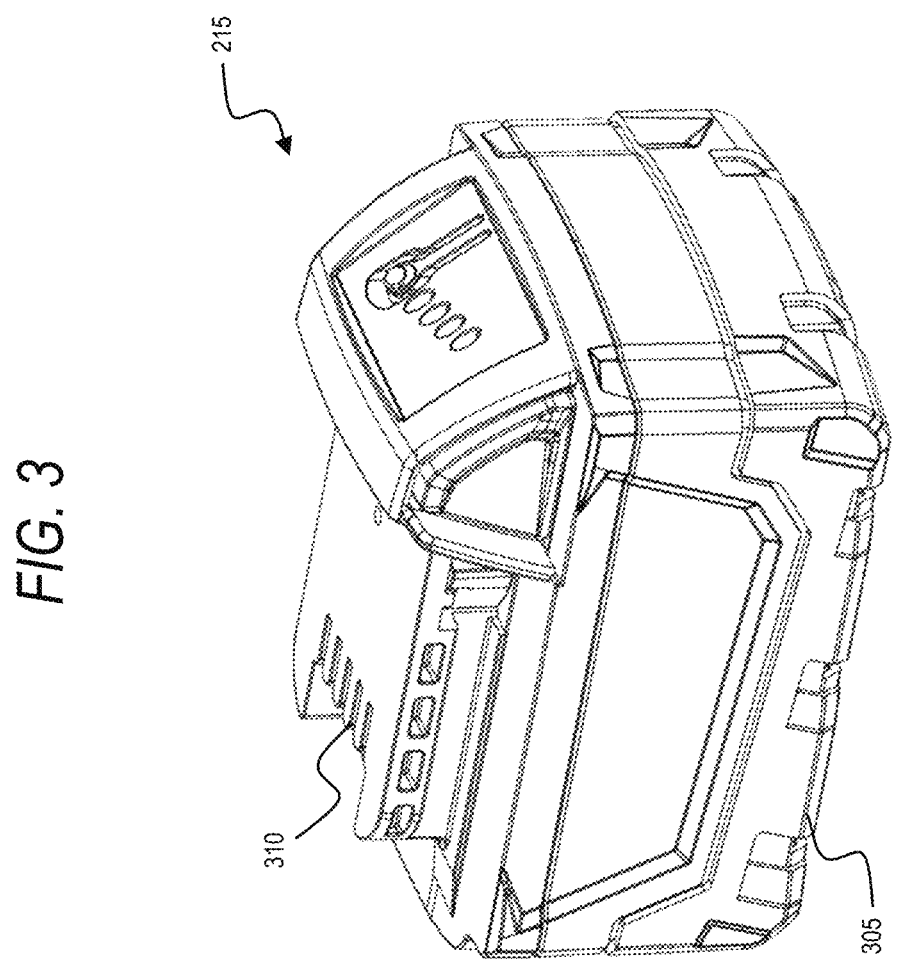

FIG. 3 illustrates a battery pack 215 that is configured to receive power from the charger 100, 200. The battery pack 215 includes a housing 305 and an interface portion 310 for connecting the battery pack 215 to a device (e.g., a power tool) or a battery pack charger (e.g., charger 100, 200).

Figure 4:
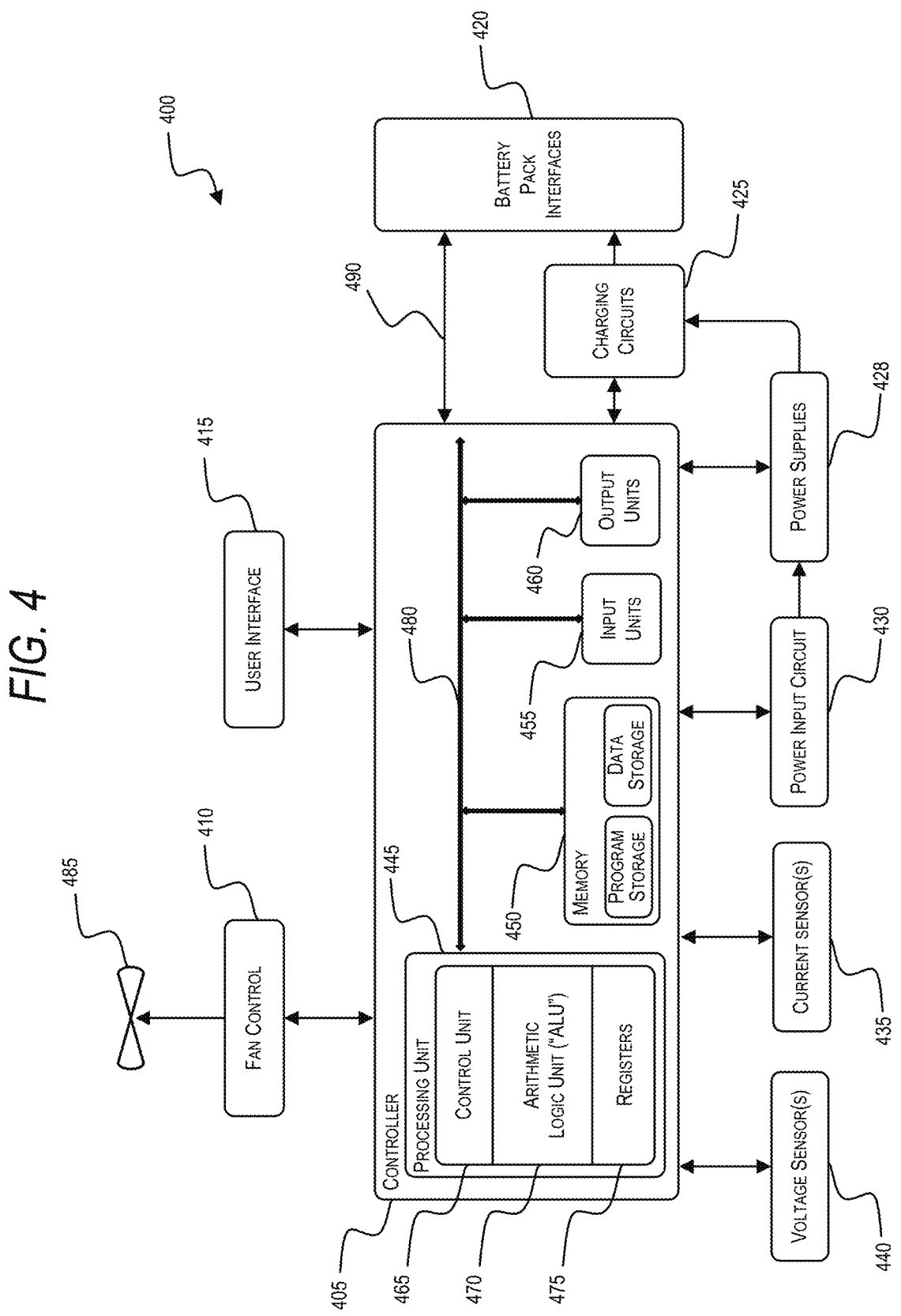
FIG. 4 illustrates a control system for the multi-bay battery pack charger of FIG. 1 or FIG. 2, according to embodiments described herein.

FIG. 4 illustrates a control system 400 for the charger 100, 200. The control system includes a controller 405. The controller 405 is electrically and/or communicatively connected to a variety of modules or components of the charger 100, 200. For example, the illustrated controller 405 is electrically connected to a fan control 410, a user interface 415, battery pack interfaces 420, charging circuits 425, power supplies 428, a power input circuit 430, current sensors 435, and voltage sensors 440. The controller 405 includes combinations of hardware and software that are operable to, among other things, control the operation of the charger 100, 200. The fan control 410 operates a fan 485. In some embodiments, the user interface 415 includes a touch-screen. In some embodiments, the user interface 415 includes various components (e.g., switches, buttons, levers, dials, etc.) that allow a user to interface with and control the charger 100.

The controller 405 includes a plurality of electrical and electronic components that provide power, operational control, and protection to the components and modules within the controller 405 and/or charger 100, 200. For example, the controller 405 includes, among other things, a processing unit 445 (e.g., a microprocessor, a microcontroller, an electronic controller, an electronic processor, or another suitable programmable device), a memory 450, input units 455, and output units 460. The processing unit 445 includes, among other things, a control unit 465, an arithmetic logic unit ("ALU") 470, and a plurality of registers 475 (shown as a group of registers in FIG. 4), and is implemented using a known computer architecture (e.g., a modified Harvard architecture, a von Neumann architecture, etc.). The processing unit 445, the memory 450, the input units 455, and the output units 460, as well as the various modules or circuits connected to the controller 405 are connected by one or more control and/or data buses (e.g., common bus 480). The control and/or data buses are shown generally in FIG. 4 for illustrative purposes. The use of one or more control and/or data buses for the interconnection between and communication among the various modules, circuits, and components would be known to a person skilled in the art in view of the embodiments described herein.

The memory 450 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 445 is connected to the memory 450 and executes software instructions that are capable of being stored in a RAM of the memory 450 (e.g., during execution), a ROM of the memory 450 (e.g., on a generally permanent basis), or another non-transitory computer readable medium such as another memory or a disc. Software included in the implementation of the charger 100, 200 can be stored in the memory 450 of the controller 405. The software includes, for example, firmware, one or more applications, program data, filters, rules, one or more program modules, and other executable instructions. The controller 405 is configured to retrieve from the memory 450 and execute, among other things, instructions related to the control processes and methods described herein. In other constructions, the controller 405 includes additional, fewer, or different components.

The battery pack interfaces 420 include a combination of mechanical components (e.g., rails, grooves, latches, etc.) and electrical components (e.g., one or more terminals) configured to and operable for interfacing (e.g., mechanically, electrically, and communicatively connecting) the charger 100 with a battery pack (e.g., battery pack 215). For example, the battery pack interfaces 420 are configured to receive power through the charging circuits 425 via the power input circuit 430. The battery pack interfaces 420 are also configured to communicatively connect to the controller 405 via one or more communications lines 490.

In some embodiments, the controller 405 is configured to control the transfer of power to the charging circuits 425 based on detected power conditions in the charger 100. For example, the current sensors 435 and the voltage sensors 440 communicate to the controller 405 the amount of current and voltage available in the charger 100, respectively. The individual charging circuits 425 can communicate, to the controller, the amount of power needed by the battery packs 215 as well as the power rating of the battery packs 215 that are electrically connected to the respective charging circuits 425.

The controller 405 is configured to control switches coupled to power supplies 428 to output a requested power from at least one charging circuit 425 to the battery pack(s) 215. In some embodiments, the controller 405 controls the switches based on an input received at the user interface 415. For example, when the battery pack includes two charging ports (e.g., battery pack 215), a user may wish to use a high-power configuration that charges a first battery pack at a first interface using multiple power supplies 428. In other words, the first battery pack can receive power from a first power supply and a second power supply to be charged according to a high-power configuration. As another example, a user may wish to use a low-power configuration that charges both the first battery pack and the second battery pack using the first power supply and the second power supply, respectively. The high-power configuration fully charges the first battery pack at a faster rate than the low-power configuration.

Figure 5:
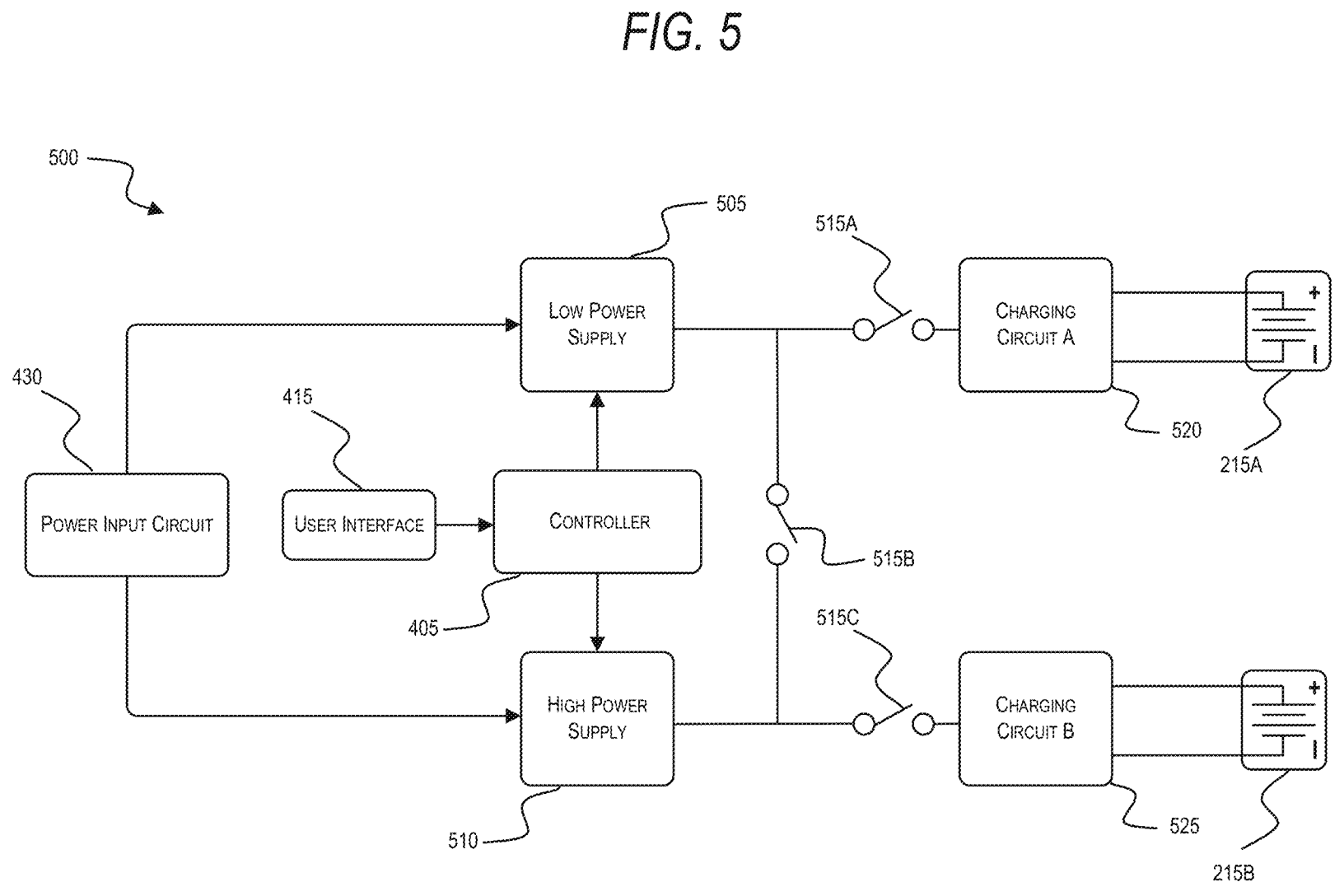

FIG. 5 illustrates a schematic diagram 500 of the charger 100 of FIG. 1 or charger 200 of FIG. 2. The schematic diagram includes the power input circuit 430, the user interface 415, the controller 405, a first power supply 505 (e.g., a 6 Amp power supply), a second power supply 510 (e.g., a 12 Amp power supply), switches 515A, 515B, 515C, charging circuit A 520, charging circuit B 525, and battery packs 215A, 215B. Although a 6 Amp power supply and a 12 Amp power supply are illustrated, different Amp values for the power supplies can also be used, the power supplies can have the same Amp rating, etc. The power input circuit 430 receives power from an external power source (e.g., a conventional wall outlet, one or more batteries, etc.) or an internal power source (e.g., one or more battery cells). The power input circuit 430 provides power to the power supplies 505, 510. The power input circuit includes circuitry that supplies the six amp power supply 505 with a first amount of power to supply six Amps to a battery pack and circuitry that supplies the 12 amp power supply 510 with a second amount of power to supply 12 Amps to a battery pack. In some embodiments, the power input circuit 430 includes a circuit breaker as branch circuit protection. In other embodiments, the power input circuit 430 includes a fuse, an overload relay, etc. The switches 515A, 515B, 515C may be mechanical switches, transistors, or the like.

The controller 405 receives inputs from the user interface 415. A user may interact with the user interface 415 to set the charge rate of the charging circuits 520, 525. A user may choose a low-power configuration or a high-power configuration. For example, the user interface 415 may include buttons (e.g., on a screen) that correspond with an off configuration, low-power configuration, a first high-power configuration, and a second high-power configuration. Other power configurations may be contemplated. In some embodiments, the controller 405 receives inputs from an external device (e.g., a mobile phone, computer, tablet, etc.) that controls the charge rate of the charging circuits 520, 525.

When a low-power configuration is input by a user at the user interface 415, the controller 405 controls switch 515A and switch 515C to close and switch 515B to open. Accordingly, the power from the six amp power supply 505 flows to charging circuit A 520, which then charges the first battery pack 215A using six Amps of current and the power from the 12 amp power supply 510 flows to charging circuit B 525, which then charges the second battery pack 215B using 12 Amps of current. In some embodiments, the first battery pack 215A and the second battery pack 215B have the same power rating. For example, both battery packs 215A, 215B may be rated for 12 Amps of current, such that the second battery pack 215B may reach full charge faster than the first battery pack 215A. In some embodiments, the first battery pack 215A may be rated for six Amps of current and the second battery pack 215B may be rated for 12 Amps of current, such that both battery packs 215A, 215B reach full charger at approximately the same time.

When a first high-power configuration is input by a user at the user interface 415, the controller 405 controls switches 515A and 515B to close and switch 515C to open. Accordingly, the power from the six amp power supply 505 and the 12 amp power supply 510 flows to charging circuit A 520, which then charges the first battery pack 215A using 18 Amps of current. Charging circuit B 525 does not receive any power. In some embodiments, the battery pack receiving 18 Amps of current may be a high-capacity, high-output battery pack that requires 18 Amps of current to be charged. As noted above, the values of 6 Amps and 12 Amps are merely used for illustrative purposes, and other current ratings can be used (e.g., any current rating between 1 Amp and 30 Amps).

When a second high-power configuration is input by a user at the user interface 415, the controller 405 controls switches 515B and 515C to close and switch 515A to open. Accordingly, the power from the six amp power supply 505 and the 12 amp power supply 510 flows to charging circuit B 525, which then charges the second battery pack 215B using 18 Amps of current. Charging circuit A 520 does not receive any power.

In some embodiments, the battery pack receiving the output from both power supplies 505A, 505B (e.g., in the high-power configurations) reaches a full charge faster than when both the battery packs receive power from their respective power supplies (e.g., in the low-power configuration).

In some embodiments, the switches 515A, 515B, 515C may all be open when the charger 100, 200 is in the off configuration or no battery packs 215 are attached to the charger 100, 200.

In some embodiments, a user may wish to conserve power from the power input circuit 430 and, thus, may wish for only one battery pack to receive charging power. For example, the user may choose an input on the user interface 415 that communicates to the controller 405 to charge the first battery pack 215A only. In this example, switch 515A is closed and switches 515B and 515C are open. As another example, the user may choose an input on the user interface 415 that communicates to the controller 405 to charge the second battery pack 215B only. In this example, switch 515C is closed and switches 515A and 515B are open.

Tables 1-6, below, are examples of the various power output configurations that may be implemented by the charger 100, 200, and more specifically, by the circuit components in the schematic diagram 500. In some embodiments, the user interface 415 may include inputs (e.g., buttons, switches, etc.) corresponding to each power output configuration. Switch designations of $S_A$, $S_B$, and $S_C$ correspond to switches 515A, 515B, and 515C, respectively.

TABLE 1

| Output Circuitry | Switch Combinations | | Battery Packs | Power Output |
|---|---|---|---|---|
| Power Output A | $S_A$ | ON | Battery Pack 1 | A |
| | $S_B$ | OFF | | |
| | $S_C$ | ON | | |
| Power Output B | $S_A$ | ON | Battery Pack 2 | B |
| | $S_B$ | OFF | | |
| | $S_C$ | ON | | |

TABLE 2

| Output Circuitry | Switch Combinations | | Battery Packs | Power Output |
|---|---|---|---|---|
| Power Output A | $S_A$ | ON | Battery Pack 1 | A + B |
| | $S_B$ | ON | | |
| | $S_C$ | OFF | | |
| Power Output B | $S_A$ | ON | Battery Pack 2 | 0 |
| | $S_B$ | ON | | |
| | $S_C$ | OFF | | |

TABLE 3

| Output Circuitry | Switch Combinations | | Battery Packs | Power Output |
|---|---|---|---|---|
| Power Output A | $S_A$ | OFF | Battery Pack 1 | 0 |
| | $S_B$ | ON | | |
| | $S_C$ | ON | | |
| Power Output B | $S_A$ | OFF | Battery Pack 2 | A + B |
| | $S_B$ | ON | | |
| | $S_C$ | ON | | |

TABLE 4

| Output Circuitry | Switch Combinations | | Battery Packs | Power Output |
|---|---|---|---|---|
| Power Output A | $S_A$ | ON | Battery Pack 1 | A |
| | $S_B$ | OFF | | |
| | $S_C$ | OFF | | |
| Power Output B | $S_A$ | ON | Battery Pack 2 | 0 |
| | $S_B$ | OFF | | |
| | $S_C$ | OFF | | |

TABLE 5

| Output Circuitry | Switch Combinations | | Battery Packs | Power Output |
|---|---|---|---|---|
| Power Output A | $S_A$ | OFF | Battery Pack 1 | 0 |
| | $S_B$ | OFF | | |
| | $S_C$ | ON | | |
| Power Output B | $S_A$ | OFF | Battery Pack 2 | B |
| | $S_B$ | OFF | | |
| | $S_C$ | ON | | |

TABLE 6

| Output Circuitry | Switch Combinations | | Battery Pack | Power Output |
|---|---|---|---|---|
| Power Output A | $S_A$ | OFF | Battery Pack 1 | 0 |
| | $S_B$ | OFF | | |

TABLE 6-continued

| Output Circuitry | Switch Combinations | | Battery Pack | Power Output |
|---|---|---|---|---|
| | $S_C$ | OFF | | |
| Power Output B | $S_A$ | OFF | Battery Pack 2 | 0 |
| | $S_B$ | OFF | | |
| | $S_C$ | OFF | | |

Figure 6:
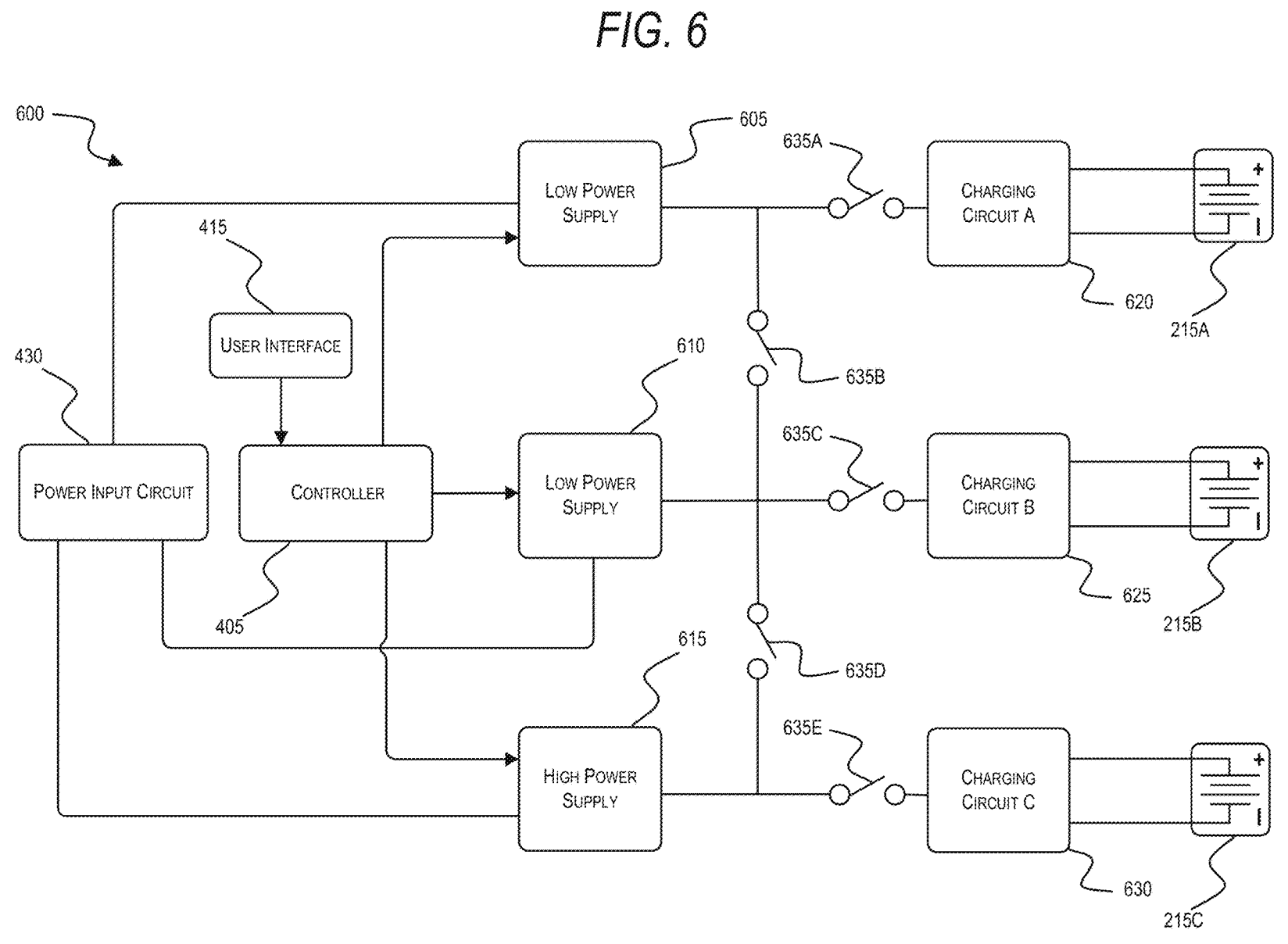

FIG. 6 illustrates a schematic diagram 600 of the charger 200 of FIG. 2. The schematic diagram 600 incudes the power input circuit 430, the user interface 415, the controller 405, a first power supply 605 (e.g., a 6 Amp power supply), a second power supply 610 (e.g., a 6 Amp power supply), a third power supply 615 (e.g., a 12 Amp power supply), switches 635A, 635B, 635C, 635D, 635E, charging circuit A 620, charging circuit B 625, charging circuit C 630, and battery packs 215A, 215B, 215C. The power input circuit 430 receives power from an external power source (e.g., a conventional wall outlet, one or more batteries, etc.) or an internal power source (e.g., one or more battery cells). The power input circuit 430 provides power to the power supplies 605, 610, 615. The power input circuit includes circuitry that supplies the six amp power supplies 605, 610 with a first amount of power to supply six Amps to battery packs and circuitry that supplies the 12 amp power supply 615 with a second amount of power to supply 12 Amps to a battery pack. In some embodiments, the power input circuit 430 includes a circuit breaker as branch circuit protection. In other embodiments, the power input circuit 430 includes a fuse, an overload relay, etc. The switches 635A, 635B, 635C, 635D, 635E may be mechanical switches, transistors, or the like. The values of 6 Amps and 12 Amps are merely used for illustrative purposes, and other current ratings can be used (e.g., any current rating between 1 Amp and 30 Amps).

Similar to the schematic diagram 500, the controller 405 in the schematic diagram 600 receives inputs from the user interface 415. A user may interact with the user interface 415 to set the charge rate of the charging circuits 620, 625, 630. A user may choose a low-power configuration, a medium power configuration, or a high-power configuration. For example, the user interface 415 may include buttons (e.g., on a screen) that correspond with an off configuration, low-power configuration, a first medium power configuration, a second medium power configuration, a first high-power configuration, a second high-power configuration, and a third high power configuration. Other power configurations may be contemplated as well. In some embodiments, the controller 405 receives inputs from an external device (e.g., a mobile phone, computer, tablet, etc.) that controls the charge rate of the charging circuits 620, 625, 630.

When a low-power configuration is input by a user at the user interface 415, the controller 405 controls switches 635A, 635C, 635E to close and switches 635B, 635D to open. Accordingly, the power from the first six amp power supply 605 flows to charging circuit A 620, which then charges the first battery pack 215A using six Amps of current, the power from the second six amp power supply 610 flows to charging circuit B 625, which then charges the second battery pack 215B using six Amps of current, and the power from the 12 amp power supply 615 flows to charging circuit C 630, which then charges the third battery pack 215C using 12 Amps of current. In some embodiments, the first battery pack 215A, the second battery pack 215B, and the third battery pack 215C have the same power rating. For example, the battery packs 215A, 215B, 215C may be rated for 12 Amps of current, such that the third battery pack 215C may reach full charge faster than the first and second battery packs 215A, 215B. In some embodiments, the first battery pack 215A may be rated for six Amps of current and the second and third battery packs 215B, 215C may be rated for 12 Amps of current, such that the first and third battery packs 215A, 215C reach full charge at approximately the same time. In some embodiments, the second battery pack 215B may be rated for six Amps of current and the first and third battery packs 215A, 215C may be rated for 12 Amps of current, such that they second and third battery packs 215B, 215C reach full charge at the same time. In some embodiments, in the low-power configuration, the charger 200 operates as described but only closes switches 635A, 635C, 635E if a battery pack is detected by the charger 200 (e.g., based on communication with the battery pack).

When a first medium-power configuration is input by a user at the user interface 415, the controller 405 controls switches 635A, 635B, 635E to close and switches 635C, 635D to open. Accordingly, the power from the first six amp power supply 605 and the second six amp power supply 610 flows to charging circuit A 620, which then charges the first battery pack 215A using twelve Amps of current and the power from the 12 amp power supply 615 flows to charging circuit C 630, which then charges the third battery pack 215C using 12 Amps of current.

When a second medium-power configuration is input by a user at the user interface 415, the controller 405 control switches 635B, 635C, 635E to close and switches 635A, 635D to open. Accordingly, the power from the first six amp power supply 605 and the second six amp power supply 610 flows to charging circuit B 625, which then charges the second battery pack 215B using twelve Amps of current and the power from the 12 amp power supply 615 flows to charging circuit C 630, which then charges the third battery pack 215C using 12 Amps of current.

When a first high-power configuration is input by a user at the user interface 415, the controller 405 controls switches 635A, 635B, 635D to close and switches 635C, 635E to open. Accordingly, the power from the first six amp power supply 605, the second six amp power supply 610, and the 12 amp power supply 615 flows to charging circuit A 620, which then charges the first battery pack 215A using 24 Amps of current. Charging circuit B 625 and charging circuit C do not receive any power. In some embodiments, the battery pack receiving 24 Amps of current may be a high-capacity, high-output battery pack that requires 24 Amps of current to be charged.

When a second high-power configuration is input by a user at the user interface 415, the controller 405 controls switches 635B, 635C, 635D to close and switches 635A, 635E to open. Accordingly, the power from the first six amp power supply 605, the second six amp power supply 610, and the 12 amp power supply 615 flows to charging circuit B 625, which then charges the second battery pack 215B using 24 Amps of current. Charging circuit A 620 and charging circuit C 630 do not receive any power.

When a third high-power configuration is input by a user at the user interface 415, the controller 405 controls switches 635B, 635D, 635E to close and switches 635A, 635C to open. Accordingly, the power from the first six amp power supply 605, the second six amp power supply 610, and the 12 amp power supply 615 flows to charging circuit C 630, which then charges the third battery pack 215C using 24 Amps of current. Charging circuit A 620 and charging circuit B 625 do not receive any power.

In some embodiments, the battery pack receiving the output from the power supplies 605, 610, 615 (e.g., in one of the high-power configurations) reaches a full charge faster than when each of the battery packs receive power from their respective power supplies (e.g., in the low-power configuration) and when in one of the medium-power configurations.

In some embodiments, the switches 635A, 635B, 635C, 635D, 635E may all be open when the charger 200 is in the off configuration or no battery packs 215 are attached to the charger 200.

In some embodiments, a user may wish to conserve power from the power input circuit 430 and, thus, may wish for only one battery pack to receive charging power. For example, the user may choose a button on the user interface 415 that communicates to the controller 405 to charge the first battery pack 215A only. In this example, switch 635A is closed and switches 635B, 635C, 635D, 635E are open. As another example, the user may choose a button on the user interface 415 that communicates to the controller 405 to charge the second battery pack 215B only. In this example, switch 635C is closed and switches 635A, 635B, 635D, 635E are open. As another example, the user may choose a button on the user interface 415 that communicates to the controller 405 to charge the third battery pack 215C only. In this example, switch 635E is closed and switches 635A, 635B, 635C, 635D are open.

Figure 7:
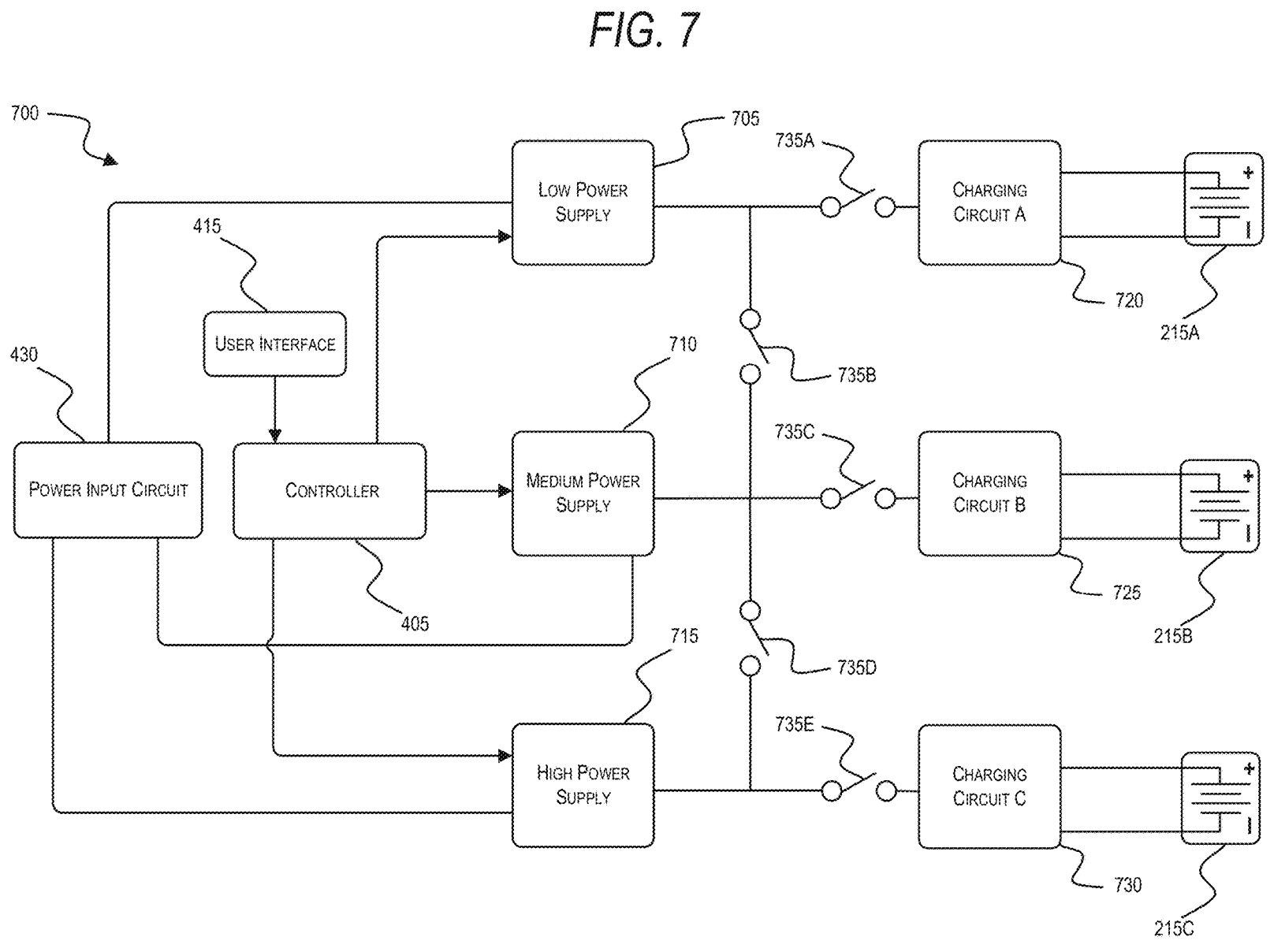

FIG. 7 illustrates a schematic diagram 700 of the charger 200 of FIG. 2. The schematic diagram 700 incudes the power input circuit 430, the user interface 415, the controller 405, a first power supply 705 (e.g., a low or 6 Amp power supply), a second power supply 710 (e.g., a medium or 9 Amp power supply), a third power supply 715 (e.g., a high or 12 Amp power supply), switches 735A, 735B, 735C, 735D, 735E, charging circuit A 720, charging circuit B 725, charging circuit C 730, and battery packs 215A, 215B, 215C. In the illustrated embodiment, each of the power supplies 705, 710, 715 has a different current rating. The power input circuit 430 receives power from an external power source (e.g., a conventional wall outlet, one or more batteries, etc.) or an internal power source (e.g., one or more battery cells). The power input circuit 430 provides power to the power supplies 705, 710, 715. The power input circuit includes circuitry that supplies the six amp power supply 705 with a first amount of power to supply six Amps to battery packs, circuitry that supplies the nine amp power supply 710 with a second amount of power to supply nine Amps to battery packs, and circuitry that supplies the 12 amp power supply 715 with a third amount of power to supply 12 Amps to a battery pack. In some embodiments, the power input circuit 430 includes a circuit breaker as branch circuit protection. In other embodiments, the power input circuit 430 includes a fuse, an overload relay, etc. The switches 735A, 735B, 735C, 735D, 735E may be mechanical switches, transistors, or the like. The values of 6 Amps, 9 Amps, and 12 Amps are merely used for illustrative purposes, and other current ratings can be used (e.g., any current rating between 1 Amp and 30 Amps).

Similar to the schematic diagrams 500, 600, the controller 405 in the schematic diagram 700 receives inputs from the user interface 415. A user may interact with the user interface 415 to set the charge rate of the charging circuits 720, 725, 730. A user may choose a low-power configuration, a medium power configuration, or a high-power configuration. For example, the user interface 415 may include buttons (e.g., on a screen) that correspond with an off configuration, low-power configuration, a first medium power configuration, a second medium power configuration, a first high-power configuration, a second high-power configuration, and a third high power configuration. Other power configurations may be contemplated as well. In some embodiments, the controller 405 receives inputs from an external device (e.g., a mobile phone, computer, tablet, etc.) that controls the charge rate of the charging circuits 720, 725, 730.

When a low-power configuration is input by a user at the user interface 415, the controller 405 controls switches 735A, 735C, 735E to close and switches 735B, 735D to open. Accordingly, the power from the six amp power supply 705 flows to charging circuit A 720, which then charges the first battery pack 215A using six Amps of current, the power from the nine amp power supply 710 flows to charging circuit B 725, which then charges the second battery pack 215B using nine Amps of current, and the power from the 12 amp power supply 715 flows to charging circuit C 730, which then charges the third battery pack 215C using 12 Amps of current. In some embodiments, the first battery pack 215A, the second battery pack 215B, and the third battery pack 215C have the same power rating. For example, the battery packs 215A, 215B, 215C may be rated for 12 Amps of current, such that the third battery pack 215C may reach full charge faster than the first and second battery packs 215A, 215B. In some embodiments, the first battery pack 215A may be rated for six Amps of current and the second and third battery packs 215B, 215C may be rated for 12 Amps of current, such that the first and third battery packs 215A, 215C reach full charge at approximately the same time. In some embodiments, the second battery pack 215B may be rated for six Amps of current and the first and third battery packs 215A, 215C may be rated for 12 Amps of current, such that they second and third battery packs 215B, 215C reach full charge at approximately the same time. In some embodiments, the first battery pack 215A may be rated for six Amps of current, the second battery pack 215B may be rated for nine Amps of current, and the third battery pack 215C may be rated for 12 Amps of current, such that each battery pack 215A, 215B, 215C reaches full charge at approximately the same time. In some embodiments, in the low-power configuration, the charger 200 operates as described but only closes switches 735A, 735C, 735E if a battery pack is detected by the charger 200 (e.g., based on communication with the battery pack).

When a first medium-power configuration is input by a user at the user interface 415, the controller 405 controls switches 735A, 735B, 735E to close and switches 735C, 735D to open. Accordingly, the power from the six amp power supply 705 and the nine amp power supply 710 flows to charging circuit A 720, which then charges the first battery pack 215A using 15 Amps of current and the power from the 12 amp power supply 715 flows to charging circuit C 730, which then charges the third battery pack 215C using 12 Amps of current.

When a second medium-power configuration is input by a user at the user interface 415, the controller 405 control switches 735B, 735C, 735E to close and switches 735A, 735D to open. Accordingly, the power from the six amp power supply 705 and the nine amp power supply 610 flows to charging circuit B 725, which then charges the second battery pack 215B using 15 Amps of current and the power from the 12 amp power supply 715 flows to charging circuit C 730, which then charges the third battery pack 215C using 12 Amps of current.

When a first high-power configuration is input by a user at the user interface 415, the controller 405 controls switches

735A, 735B, 735D to close and switches 735C, 735E to open. Accordingly, the power from the six amp power supply 705, the nine amp power supply 710, and the 12 amp power supply 715 flows to charging circuit A 720, which then charges the first battery pack 215A using 27 Amps of current. Charging circuit B 725 and charging circuit C do not receive any power. In some embodiments, the battery pack receiving 27 Amps of current may be a high-capacity, high-output battery pack that requires 27 Amps of current to be charged.

When a second high-power configuration is input by a user at the user interface 415, the controller 405 controls switches 735B, 735C, 735D to close and switches 735A, 735E to open. Accordingly, the power from the six amp power supply 705, the nine amp power supply 710, and the 12 amp power supply 715 flows to charging circuit B 725, which then charges the second battery pack 215B using 27 Amps of current. Charging circuit A 720 and charging circuit C 730 do not receive any power.

When a third high-power configuration is input by a user at the user interface 415, the controller 405 controls switches 735B, 735D, 735E to close and switches 735A, 735C to open. Accordingly, the power from the six amp power supply 705, the nine amp power supply 710, and the 12 amp power supply 715 flows to charging circuit C 730, which then charges the third battery pack 215C using 27 Amps of current. Charging circuit A 720 and charging circuit B 725 do not receive any power.

In some embodiments, the battery pack receiving the output from the power supplies 705, 710, 715 (e.g., in one of the high-power configurations) reaches a full charge faster than when each of the battery packs receive power from their respective power supplies (e.g., in the low-power configuration) and when in one of the medium-power configurations.

In some embodiments, the switches 735A, 735B, 735C, 735D, 735E may all be open when the charger 200 is in the off configuration or no battery packs 215 are attached to the charger 200.

In some embodiments, a user may wish to conserve power from the power input circuit 430 and, thus, may wish for only one battery pack to receive charging power. For example, the user may choose a button on the user interface 415 that communicates to the controller 405 to charge the first battery pack 215A only. In this example, switch 735A is closed and switches 735B, 735C, 735D, 735E are open. As another example, the user may choose a button on the user interface 415 that communicates to the controller 405 to charge the second battery pack 215B only. In this example, switch 735C is closed and switches 735A, 735B, 735D, 735E are open. As another example, the user may choose a button on the user interface 415 that communicates to the controller 405 to charge the third battery pack 215C only. In this example, switch 735E is closed and switches 735A, 735B, 735C, 735D are open.

Tables 7-24, below, are examples of the various power output configurations that may be implemented by the charger 200, and more specifically, by the circuit components in the schematic diagrams 600, 700. In some embodiments, the user interface 415 may include inputs (e.g., buttons, switches, etc.) corresponding to each power output configuration. Switch designations of $S_A$, $S_B$, $S_C$, $S_D$, and $S_E$ correspond to switches 635A, 635B, 635C, 635D, and 635E, respectively, or 735A, 735B, 735C, 735D, and 735E, respectively.

TABLE 7

| Output Circuitry | Switch Combinations | | Battery Packs | Power Output |
|---|---|---|---|---|
| Power Output A | $S_A$ | ON | Battery Pack 1 | A |
| | $S_B$ | OFF | | |
| | $S_C$ | ON | | |
| | $S_D$ | OFF | | |
| | $S_E$ | ON | | |
| Power Output B | $S_A$ | ON | Battery Pack 2 | B |
| | $S_B$ | OFF | | |
| | $S_C$ | ON | | |
| | $S_D$ | OFF | | |
| | $S_E$ | ON | | |
| Power Output C | $S_A$ | ON | Battery Pack 3 | C |
| | $S_B$ | OFF | | |
| | $S_C$ | ON | | |
| | $S_D$ | OFF | | |
| | $S_E$ | ON | | |

TABLE 8

| Output Circuitry | Switch Combinations | | Battery Packs | Power Output |
|---|---|---|---|---|
| Power Output A | $S_A$ | ON | Battery Pack 1 | A |
| | $S_B$ | OFF | | |
| | $S_C$ | ON | | |
| | $S_D$ | ON | | |
| | $S_E$ | OFF | | |
| Power Output B | $S_A$ | ON | Battery Pack 2 | B + C |
| | $S_B$ | OFF | | |
| | $S_C$ | ON | | |
| | $S_D$ | ON | | |
| | $S_E$ | OFF | | |
| Power Output C | $S_A$ | ON | Battery Pack 3 | 0 |
| | $S_B$ | OFF | | |
| | $S_C$ | ON | | |
| | $S_D$ | ON | | |
| | $S_E$ | OFF | | |

TABLE 9

| Output Circuitry | Switch Combinations | | Battery Packs | Power Output |
|---|---|---|---|---|
| Power Output A | $S_A$ | ON | Battery Pack 1 | A + B |
| | $S_B$ | ON | | |
| | $S_C$ | OFF | | |
| | $S_D$ | OFF | | |
| | $S_E$ | ON | | |
| Power Output B | $S_A$ | ON | Battery Pack 2 | 0 |
| | $S_B$ | ON | | |
| | $S_C$ | OFF | | |
| | $S_D$ | OFF | | |
| | $S_E$ | ON | | |
| Power Output C | $S_A$ | ON | Battery Pack 3 | C |
| | $S_B$ | ON | | |
| | $S_C$ | OFF | | |
| | $S_D$ | OFF | | |
| | $S_E$ | ON | | |

TABLE 10

| Output Circuitry | Switch Combinations | | Battery Packs | Power Output |
|---|---|---|---|---|
| Power Output A | $S_A$ | OFF | Battery Pack 1 | 0 |
| | $S_B$ | ON | | |
| | $S_C$ | ON | | |
| | $S_D$ | OFF | | |
| | $S_E$ | ON | | |
| Power Output B | $S_A$ | OFF | Battery Pack 2 | A + B |
| | $S_B$ | ON | | |

TABLE 10-continued

| Output Circuitry | Switch Combinations | | Battery Packs | Power Output |
|---|---|---|---|---|
| | $S_C$ | ON | | |
| | $S_D$ | OFF | | |
| | $S_E$ | ON | | |
| Power Output C | $S_A$ | OFF | Battery Pack 3 | C |
| | $S_B$ | ON | | |
| | $S_C$ | ON | | |
| | $S_D$ | OFF | | |
| | $S_E$ | ON | | |

TABLE 11

| Output Circuitry | Switch Combinations | | Battery Packs | Power Output |
|---|---|---|---|---|
| Power Output A | $S_A$ | ON | Battery Pack 1 | A |
| | $S_B$ | OFF | | |
| | $S_C$ | OFF | | |
| | $S_D$ | ON | | |
| | $S_E$ | ON | | |
| Power Output B | $S_A$ | ON | Battery Pack 2 | 0 |
| | $S_B$ | OFF | | |
| | $S_C$ | OFF | | |
| | $S_D$ | ON | | |
| | $S_E$ | ON | | |
| Power Output C | $S_A$ | ON | Battery Pack 3 | B + C |
| | $S_B$ | OFF | | |
| | $S_C$ | OFF | | |
| | $S_D$ | ON | | |
| | $S_E$ | ON | | |

TABLE 12

| Output Circuitry | Switch Combinations | | Battery Packs | Power Output |
|---|---|---|---|---|
| Power Output A | $S_A$ | ON | Battery Pack 1 | A + B + C |
| | $S_B$ | ON | | |
| | $S_C$ | OFF | | |
| | $S_D$ | ON | | |
| | $S_E$ | OFF | | |
| Power Output B | $S_A$ | ON | Battery Pack 2 | 0 |
| | $S_B$ | ON | | |
| | $S_C$ | OFF | | |
| | $S_D$ | ON | | |
| | $S_E$ | OFF | | |
| Power Output C | $S_A$ | ON | Battery Pack 3 | 0 |
| | $S_B$ | ON | | |
| | $S_C$ | OFF | | |
| | $S_D$ | ON | | |
| | $S_E$ | OFF | | |

TABLE 13

| Output Circuitry | Switch Combinations | | Battery Packs | Power Output |
|---|---|---|---|---|
| Power Output A | $S_A$ | OFF | Battery Pack 1 | 0 |
| | $S_B$ | ON | | |
| | $S_C$ | ON | | |
| | $S_D$ | ON | | |
| | $S_E$ | OFF | | |
| Power Output B | $S_A$ | OFF | Battery Pack 2 | A + B + C |
| | $S_B$ | ON | | |
| | $S_C$ | ON | | |
| | $S_D$ | ON | | |
| | $S_E$ | OFF | | |
| Power Output C | $S_A$ | OFF | Battery Pack 3 | 0 |
| | $S_B$ | ON | | |
| | $S_C$ | ON | | |
| | $S_D$ | ON | | |

TABLE 13-continued

| Output Circuitry | Switch Combinations | | Battery Packs | Power Output |
|---|---|---|---|---|
| | $S_E$ | OFF | | |

TABLE 14

| Output Circuitry | Switch Combinations | | Battery Packs | Power Output |
|---|---|---|---|---|
| Power Output A | $S_A$ | OFF | Battery Pack 1 | 0 |
| | $S_B$ | ON | | |
| | $S_C$ | OFF | | |
| | $S_D$ | ON | | |
| | $S_E$ | ON | | |
| Power Output B | $S_A$ | OFF | Battery Pack 2 | 0 |
| | $S_B$ | ON | | |
| | $S_C$ | OFF | | |
| | $S_D$ | ON | | |
| | $S_E$ | ON | | |
| Power Output C | $S_A$ | OFF | Battery Pack 3 | A + B + C |
| | $S_B$ | ON | | |
| | $S_C$ | OFF | | |
| | $S_D$ | ON | | |
| | $S_E$ | ON | | |

TABLE 15

| Output Circuitry | Switch Combinations | | Battery Packs | Power Output |
|---|---|---|---|---|
| Power Output A | $S_A$ | ON | Battery Pack 1 | A |
| | $S_B$ | OFF | | |
| | $S_C$ | OFF | | |
| | $S_D$ | OFF | | |
| | $S_E$ | OFF | | |
| Power Output B | $S_A$ | ON | Battery Pack 2 | 0 |
| | $S_B$ | OFF | | |
| | $S_C$ | OFF | | |
| | $S_D$ | OFF | | |
| | $S_E$ | OFF | | |
| Power Output C | $S_A$ | ON | Battery Pack 3 | 0 |
| | $S_B$ | OFF | | |
| | $S_C$ | OFF | | |
| | $S_D$ | OFF | | |
| | $S_E$ | OFF | | |

TABLE 16

| Output Circuitry | Switch Combinations | | Battery Packs | Power Output |
|---|---|---|---|---|
| Power Output A | $S_A$ | OFF | Battery Pack 1 | 0 |
| | $S_B$ | OFF | | |
| | $S_C$ | ON | | |
| | $S_D$ | OFF | | |
| | $S_E$ | OFF | | |
| Power Output B | $S_A$ | OFF | Battery Pack 2 | B |
| | $S_B$ | OFF | | |
| | $S_C$ | ON | | |
| | $S_D$ | OFF | | |
| | $S_E$ | OFF | | |
| Power Output C | $S_A$ | OFF | Battery Pack 3 | 0 |
| | $S_B$ | OFF | | |
| | $S_C$ | ON | | |
| | $S_D$ | OFF | | |
| | $S_E$ | OFF | | |

TABLE 17

| Output Circuitry | Switch Combinations | | Battery Packs | Power Output |
|---|---|---|---|---|
| Power Output A | $S_A$ | OFF | Battery Pack 1 | 0 |
| | $S_B$ | OFF | | |
| | $S_C$ | OFF | | |
| | $S_D$ | OFF | | |
| | $S_E$ | ON | | |
| Power Output B | $S_A$ | OFF | Battery Pack 2 | 0 |
| | $S_B$ | OFF | | |
| | $S_C$ | OFF | | |
| | $S_D$ | OFF | | |
| | $S_E$ | ON | | |
| Power Output C | $S_A$ | OFF | Battery Pack 3 | C |
| | $S_B$ | OFF | | |
| | $S_C$ | OFF | | |
| | $S_D$ | OFF | | |
| | $S_E$ | ON | | |

TABLE 18

| Output Circuitry | Switch Combinations | | Battery Packs | Power Output |
|---|---|---|---|---|
| Power Output A | $S_A$ | ON | Battery Pack 1 | A |
| | $S_B$ | OFF | | |
| | $S_C$ | ON | | |
| | $S_D$ | OFF | | |
| | $S_E$ | OFF | | |
| Power Output B | $S_A$ | ON | Battery Pack 2 | B |
| | $S_B$ | OFF | | |
| | $S_C$ | ON | | |
| | $S_D$ | OFF | | |
| | $S_E$ | OFF | | |
| Power Output C | $S_A$ | ON | Battery Pack 3 | 0 |
| | $S_B$ | OFF | | |
| | $S_C$ | ON | | |
| | $S_D$ | OFF | | |
| | $S_E$ | OFF | | |

TABLE 19

| Output Circuitry | Switch Combinations | | Battery Packs | Power Output |
|---|---|---|---|---|
| Power Output A | $S_A$ | OFF | Battery Pack 1 | 0 |
| | $S_B$ | OFF | | |
| | $S_C$ | ON | | |
| | $S_D$ | OFF | | |
| | $S_E$ | ON | | |
| Power Output B | $S_A$ | OFF | Battery Pack 2 | B |
| | $S_B$ | OFF | | |
| | $S_C$ | ON | | |
| | $S_D$ | OFF | | |
| | $S_E$ | ON | | |
| Power Output C | $S_A$ | OFF | Battery Pack 3 | C |
| | $S_B$ | OFF | | |
| | $S_C$ | ON | | |
| | $S_D$ | OFF | | |
| | $S_E$ | ON | | |

TABLE 20

| Output Circuitry | Switch Combinations | | Battery Packs | Power Output |
|---|---|---|---|---|
| Power Output A | $S_A$ | ON | Battery Pack 1 | A |
| | $S_B$ | OFF | | |
| | $S_C$ | OFF | | |
| | $S_D$ | OFF | | |
| | $S_E$ | ON | | |
| Power Output B | $S_A$ | ON | Battery Pack 2 | 0 |
| | $S_B$ | OFF | | |

TABLE 20-continued

| Output Circuitry | Switch Combinations | | Battery Packs | Power Output |
|---|---|---|---|---|
| | $S_C$ | OFF | | |
| | $S_D$ | OFF | | |
| | $S_E$ | ON | | |
| Power Output C | $S_A$ | ON | Battery Pack 3 | C |
| | $S_B$ | OFF | | |
| | $S_C$ | OFF | | |
| | $S_D$ | OFF | | |
| | $S_E$ | ON | | |

TABLE 21

| Output Circuitry | Switch Combinations | | Battery Packs | Power Output |
|---|---|---|---|---|
| Power Output A | $S_A$ | OFF | Battery Pack 1 | 0 |
| | $S_B$ | OFF | | |
| | $S_C$ | OFF | | |
| | $S_D$ | OFF | | |
| | $S_E$ | OFF | | |
| Power Output B | $S_A$ | OFF | Battery Pack 2 | 0 |
| | $S_B$ | OFF | | |
| | $S_C$ | OFF | | |
| | $S_D$ | OFF | | |
| | $S_E$ | OFF | | |
| Power Output C | $S_A$ | OFF | Battery Pack 3 | 0 |
| | $S_B$ | OFF | | |
| | $S_C$ | OFF | | |
| | $S_D$ | OFF | | |
| | $S_E$ | OFF | | |

Figure 8:
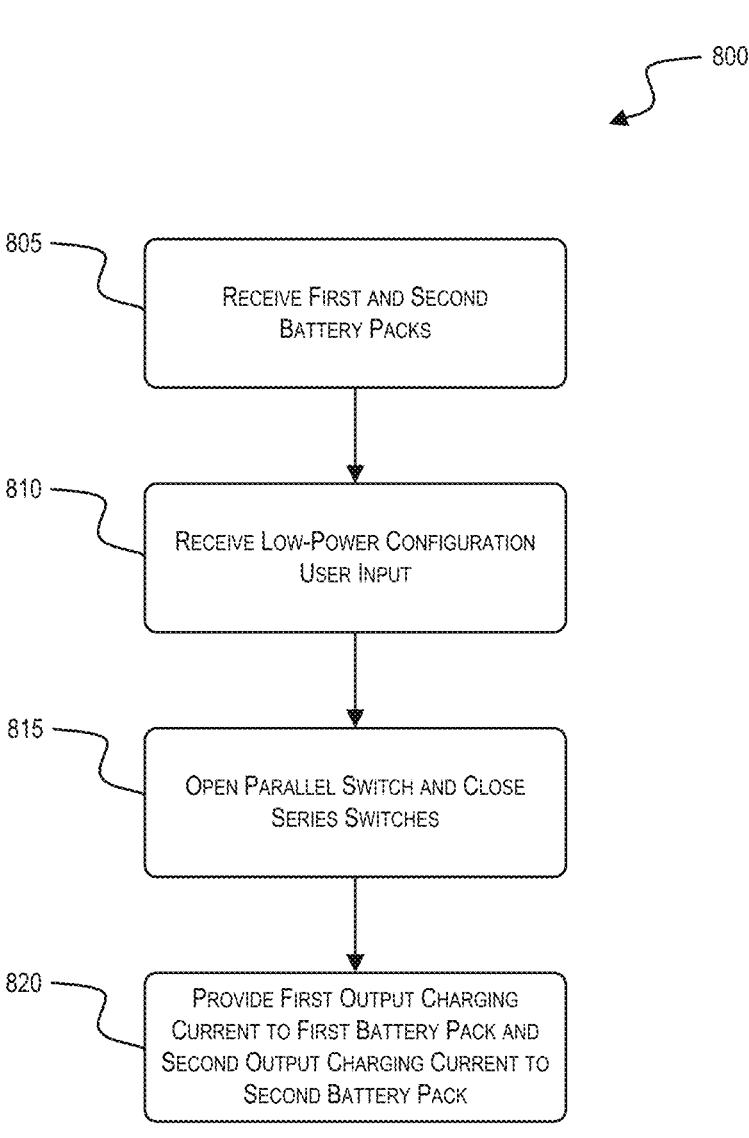
FIG. 8 is a process for providing a low power charging current to a first battery pack and a second battery pack, according to embodiments described herein.

FIG. 8 is a process 800 for providing a low-power charging current to the first battery pack 215A and the second battery pack 215B of the schematic diagram 500 of FIG. 5. The process 800 begins with the charger 100, 200 receiving the first battery pack 215A and the second battery pack 215B (Block 805). In some embodiments, the controller 405 determines that the battery packs 215A, 215B have been received by the charger 100, 200 by at least one of sensing a current of the battery packs, sensing a voltage of the battery packs, a mechanical switch in the battery pack interfaces 420, communication with the battery packs, etc. At block 810, the controller 405 receives a low-power configuration user input. In some embodiments, the user input is received from a user interacting with the user interface 415. Alternatively or additionally, in some embodiments, the user input is received from an external device (e.g., a smart phone).

At block 815, the controller 405 opens the parallel switch (e.g., switch 515B in schematic diagram 500 of FIG. 5) and closes the series switches (e.g., switches 515A, 515C in schematic diagram 500 of FIG. 5). The switches may be mechanical switches, transistors, etc. A first output charging current is provided to the first battery pack 215A and a second output charging current is provided to the second battery pack 215B (Block 820). In some embodiments, the first output charging current may be less than the second output charging current. For example, the first output charging current may be six Amps, and the second output charging current may be 12 Amps. In some embodiments, the first and second output charging currents may be the same.

Figure 9:
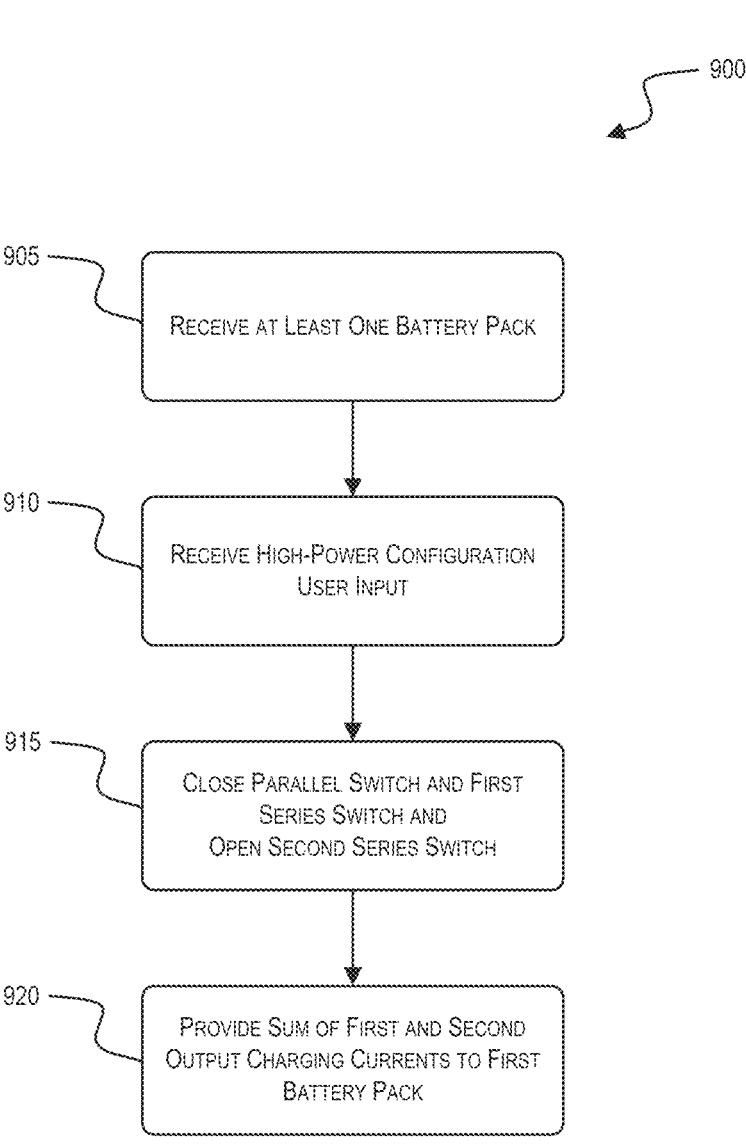
FIG. 9 is a process for providing a high power charging current to a first battery pack, according to embodiments described herein.

FIG. 9 is a process 900 for providing a high-power charging current to one of the first battery pack 215A and the second battery pack 215B of the schematic diagram 500 of FIG. 5. The process 900 begins with the charger 100, 200 receiving at least one of the first battery pack 215A and the second battery pack 215B (Block 905). In some embodiments, the controller 405 determines that the battery packs 215A, 215B have been received by the charger 100, 200 by at least one of sensing a current of the battery packs, sensing a voltage of the battery packs, a mechanical switch in the battery pack interfaces 420, communication with the battery packs, etc. At block 910, the controller 405 receives a high-power configuration user input. In some embodiments, the user input is received from a user interacting with the user interface 415. Alternatively or additionally, in some embodiments, the user input is received from an external device (e.g., a smart phone).

At block 915, the controller 405 closes the parallel switch and the first series switch (e.g., switches 515A, 515B in schematic diagram 500 of FIG. 5) and opens the second series switch (e.g., switch 515C in schematic diagram 500 of FIG. 5). In some embodiments, based on the user input, the controller 405 closes the parallel switch and the second series switch (e.g., switches 515B, 515C in schematic diagram 500 of FIG. 5) and opens the first series switch (e.g., switch 515A in schematic diagram 500 of FIG. 5). The switches may be mechanical switches, transistors, etc. The sum of the first and second output charging currents is provided to the first battery pack 215A (Block 920). The second battery pack 215B does not receive any charging current. In the high-power configuration, a single battery pack is charged using both output charging currents, such that the single battery pack may be charged more quickly.

Figure 10:
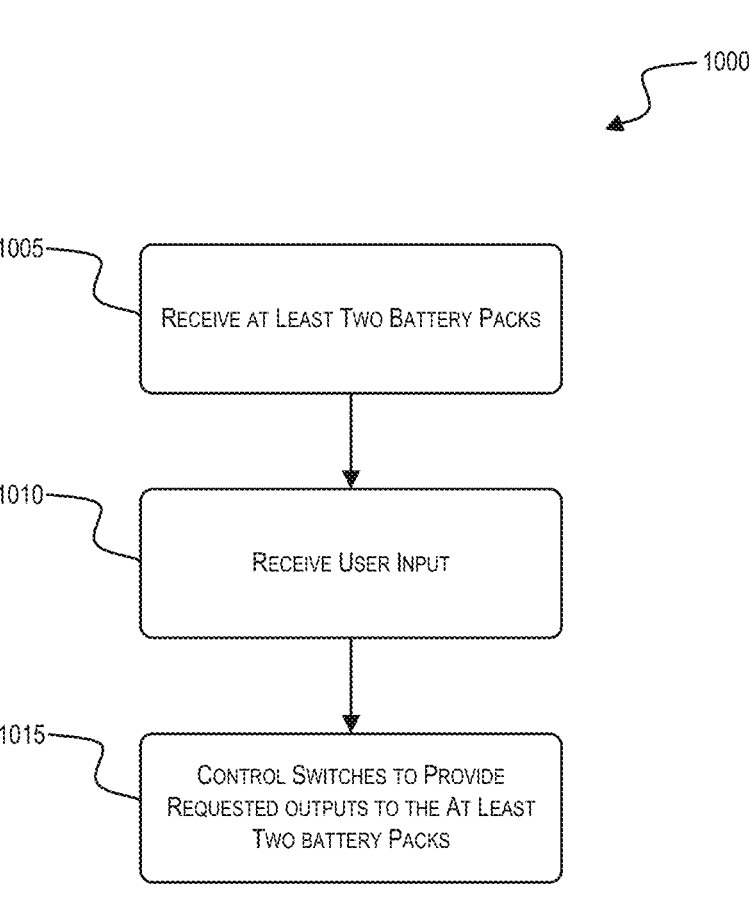
FIG. 10 is a process for providing a requested charging current to at least two battery packs, according to embodiments described herein.

FIG. 10 is a process 1000 for providing a requested charging current to at least two battery packs of the schematic diagrams 500, 600, 700 of FIGS. 5-7. The process 1000 begins with the charger 100, 200 receiving at least two battery packs (Block 1005). In some embodiments, the controller 405 determines that at least two battery packs have been received by the charger 200 by at least one of sensing a current of the battery packs, sensing a voltage of the battery packs, a mechanical switch in the battery pack interfaces 420, communication with the battery packs, etc. At block 1010, the controller 405 receives a user input. In some embodiments, the user input may be one of a low-power configuration, a medium power configuration, or a high-power configuration. For example, the user input may correspond to any one of the power output configurations illustrated by Tables 1-21. In some embodiments, Block 1010 may be skipped, and the controller 405 automatically controls the switches to provide power to the at least two battery packs. In some embodiments, based on at least one of a sensed or received power rating of the at least two battery packs and a charge level of the at least two battery packs, the controller 405 may control the switches to provide power to the battery packs. For example, a first battery pack may be depleted of charge and a second battery pack may be charged above a threshold value such that the controller 405 automatically controls the switches to provide a total power to the first battery pack.

At block 1015, the controller 405 controls the switches to provide the requested power outputs to the at least two battery packs. The switches may be mechanical switches, transistors, etc. Based on the configuration of open and closed switches, the charging currents output to the at least two battery packs corresponds to the user input.

Although the blocks of processes 800, 900, 1000 are illustrated serially and in a particular order in FIGS. 8, 9, and 10, in some embodiments, one or more of the blocks are implemented in parallel, are implemented in a different order, or are bypassed.

Thus, embodiments described herein provide, among other things, systems and methods for setting and providing at least one output charging current to at least one battery pack received by a multi-bay battery pack charger. Various features and advantages are set forth in the following claims.

What is claimed is:

1. A battery pack charger comprising:
a housing;
a plurality of battery pack receptacles supported by the housing, each of the plurality of battery pack receptacles configured to receive a battery pack;
a plurality of output power supplies;
a plurality of charging circuits, each of the plurality of charging circuits configured to transmit power from at least one of the plurality of output power supplies to one of the plurality of battery pack receptacles;
a plurality of switches associated with the plurality of charging circuits; and
a controller operable to:
receive an input from the plurality of charging circuits,
switch each of the plurality of switches to one of a first position or a second position based on the received input, and
provide one of a first output power and a second output power to each of the battery pack receptacles.

2. The battery pack charger of claim 1, wherein the first output power is one of a no-power output, a low-power output, and a high-power output.

3. The battery pack charger of claim 2, wherein the second output power is one of the no-power output, a medium-power output, and the high-power output.

4. The battery pack charger of claim 1, wherein the first output power is lower than the second output power based on a difference between the received inputs from the respective charging circuits.

5. The battery pack charger of claim 4, wherein:
a first switch of the plurality of switches is in the first position;
a second switch of the plurality of switches is in the second position; and
a third switch of the plurality of switches is in the first position.

6. The battery pack charger of claim 1, wherein
the first output power is zero and the second output power is a maximum charging power based on a difference between the received inputs from the respective charging circuits.

7. The battery pack charger of claim 6, wherein:
a first switch of the plurality of switches is in the first position;
a second switch of the plurality of switches is in the first position; and
a third switch of the plurality of switches is in the second position.

8. The battery pack charger of claim 1, wherein the controller is further configured to:
provide one of the first output power, the second output power, and a third output power to each of the battery pack receptacles.

9. The battery pack charger of claim 8, wherein the first output power is less than the second output power, and the second output power is less than the third output power.

10. The battery pack charger of claim 1, wherein:
the first output power corresponds to a first charging current of at least 6 Amps; and
the second output power corresponds to a second charging current of at least 9 Amps.

11. A method for providing output charging power to a plurality of battery packs, the method comprising:

receiving, at an electronic processor, an input from a plurality of charging circuits;
controlling, via the electronic processor, each of a plurality of switches of the battery pack charger to one of a first position or a second position based on the received input;
providing, via the electronic processor, a first output power to a first battery pack of the plurality of battery packs from at least a first output power supply via a first charging circuit of the plurality of charging circuits; and
providing, via the electronic processor, a second output power to a second battery pack of the plurality of battery packs from at least a second output power supply via a second charging circuit of the plurality of charging circuits.

12. The method of claim 11, wherein the first output power is one of a no-power output, a low-power output, and a high-power output.

13. The method of claim 12, wherein the second output power is one of the no-power output, a medium-power output, and the high-power output.

14. The method of claim 11 further comprising:
providing, via the electronic processor, a third output power to a third battery pack of the plurality of battery packs from at least a third output power supply via a third charging circuit.

15. A system comprising:
a plurality of battery packs; and
a battery pack charger including:
a housing;
a plurality of battery pack receptacles supported by the housing, each of the plurality of battery pack receptacles configured to receive a battery pack;
a plurality of output power supplies;
a plurality of charging circuits, each of the plurality of charging circuits configured to transmit power from at least one of the plurality of output power supplies to one of the plurality of battery pack receptacles;
a plurality of switches associated with the plurality of charging circuits; and
a controller configured to:
determine that the plurality of battery packs are received by the plurality of battery pack receptacles,
receive an input from the plurality of charging circuits,
control the plurality of switches to one of a first position or a second position based on the received input, and
provide one of a first output power and a second output power to each of the plurality of battery pack receptacles.

16. The system of claim 15, wherein the input is at least one of a power rating or a requested power corresponding to each of the plurality of battery packs.

17. The system of claim 16, wherein:
a first battery pack of the plurality of battery packs has a first power rating;
a second battery pack of the plurality of battery packs has a second power rating; and
the first power rating is lower than the second power rating.

18. The system of claim 17, wherein:
a first switch of the plurality of switches is in the first position;

a second switch of the plurality of switches is in the second position; and a third switch of the plurality of switches is in the first position.

19. The system of claim 16, wherein:

a first battery pack of the plurality of battery packs does not request power; and a second battery pack of the plurality of battery packs requests power.

20. The system of claim 19, wherein:

a first switch of the plurality of switches is in the first position;

a second switch of the plurality of switches is in the first position; and a third switch of the plurality of switches is in the second position.

\* \* \* \* \*